United States Patent
Kim et al.

(10) Patent No.: US 12,175,608 B2
(45) Date of Patent: Dec. 24, 2024

(54) CHARACTER AND COSTUME ASSIGNMENT FOR CO-LOCATED USERS

(71) Applicants: Daekun Kim, Santa Monica, CA (US);
Lei Zhang, Ann Arbor, MI (US);
Youjean Cho, New York, NY (US);
Ava Robinson, Solana Beach, CA (US);
Yu Jiang Tham, Seattle, WA (US);
Rajan Vaish, Beverly Hills, CA (US);
Andrés Monroy-Hernández, Seattle, WA (US)

(72) Inventors: Daekun Kim, Santa Monica, CA (US);
Lei Zhang, Ann Arbor, MI (US);
Youjean Cho, New York, NY (US);
Ava Robinson, Solana Beach, CA (US);
Yu Jiang Tham, Seattle, WA (US);
Rajan Vaish, Beverly Hills, CA (US);
Andrés Monroy-Hernández, Seattle, WA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 17/901,518

(22) Filed: Sep. 1, 2022

(65) Prior Publication Data
US 2024/0078759 A1    Mar. 7, 2024

(51) Int. Cl.
*G06T 19/00* (2011.01)
*G06T 13/40* (2011.01)
*G06T 17/20* (2006.01)

(52) U.S. Cl.
CPC ............ *G06T 19/006* (2013.01); *G06T 13/40* (2013.01); *G06T 17/20* (2013.01); *G06T 19/003* (2013.01)

(58) Field of Classification Search
CPC ....... G06T 19/006; G06T 13/40; G06T 17/20; G06T 19/003; G06T 2219/024;
(Continued)

(56) References Cited

U.S. PATENT DOCUMENTS

| 10,496,253 B2 | 12/2019 | Keller |
| 10,936,280 B2 | 3/2021 | Lin |

(Continued)

FOREIGN PATENT DOCUMENTS

| KR | 20200091258 A | 7/2020 |
| KR | 20200100259 A | 8/2020 |

OTHER PUBLICATIONS

International Search Report and Written Opinion for International Application No. PCT/US2023/028708, dated Nov. 3, 2023 (Mar. 11, 2023)—9 pages.

(Continued)

*Primary Examiner* — Xilin Guo
(74) *Attorney, Agent, or Firm* — CM Law; Stephen J. Weed

(57) ABSTRACT

Multi-player co-located AR experiences are augmented by assigning characters and costumes to respective participants (a.k.a. "users" of AR-enabled mobile devices) in multi-player AR sessions for storytelling, play acting, and the like. Body tracking technology and augmented reality (AR) software are used to decorate the bodies of the co-located participants with virtual costumes within the context of the multi-player co-located AR experiences. Tracked bodies are distinguished to determine which body belongs to which user and hence which virtual costume belongs to which tracked body so that corresponding costumes may be assigned for display in augmented reality. A host-guest mechanism is used for networked assignment of characters and corresponding costumes in the co-located multi-player AR session. Body tracking technology is used to move the costume with the body as movement of the assigned body is detected.

20 Claims, 8 Drawing Sheets

(58) Field of Classification Search
CPC ............... G06T 11/60; G06T 2200/24; G06T 2207/10016; G06T 7/90; G06V 40/161; G06V 20/20; A63F 13/65; A63F 13/577; A63F 13/53; G07F 17/32; G07F 17/3288; G07F 17/3272; G07F 17/3223; G06F 3/011; G06F 16/90344

See application file for complete search history.

(56) References Cited

U.S. PATENT DOCUMENTS

| | | | |
|---|---|---|---|
| 11,406,896 | B1 | 8/2022 | Cheung et al. |
| 2004/0091848 | A1 | 5/2004 | Nemitz |
| 2006/0003824 | A1 | 1/2006 | Kobayashi et al. |
| 2007/0124507 | A1 | 5/2007 | Gurram et al. |
| 2008/0141147 | A1 | 6/2008 | Buhrke et al. |
| 2011/0165939 | A1 | 7/2011 | Borst et al. |
| 2011/0314381 | A1 | 12/2011 | Fuller et al. |
| 2012/0210254 | A1* | 8/2012 | Fukuchi ............... G06F 3/012 715/757 |
| 2012/0284426 | A1 | 11/2012 | Smith et al. |
| 2013/0211843 | A1 | 8/2013 | Clarkson |
| 2013/0307856 | A1 | 11/2013 | Keane et al. |
| 2014/0080109 | A1 | 3/2014 | Haseltine et al. |
| 2014/0282013 | A1 | 9/2014 | Amijee |
| 2015/0165310 | A1 | 6/2015 | Rebh et al. |
| 2015/0278586 | A1 | 10/2015 | Madhusudhanan et al. |
| 2016/0274705 | A1 | 9/2016 | Kapadia et al. |
| 2016/0350973 | A1 | 12/2016 | Shapira et al. |
| 2018/0053351 | A1 | 2/2018 | Anderson |
| 2019/0026559 | A1 | 1/2019 | Zhan et al. |
| 2019/0114061 | A1 | 4/2019 | Daniels et al. |
| 2019/0371071 | A1 | 12/2019 | Lyons |
| 2020/0042286 | A1 | 2/2020 | Bui et al. |
| 2020/0118343 | A1 | 4/2020 | Koblin et al. |
| 2020/0326831 | A1 | 10/2020 | Marr |
| 2020/0334463 | A1 | 10/2020 | Shapira |
| 2020/0338451 | A1 | 10/2020 | Wang |
| 2021/0044779 | A1 | 2/2021 | Prins et al. |
| 2021/0081031 | A1 | 3/2021 | Perlin et al. |
| 2021/0149190 | A1 | 5/2021 | Johnson et al. |
| 2021/0256865 | A1 | 8/2021 | Koshiba et al. |
| 2021/0306387 | A1 | 9/2021 | Smith et al. |
| 2021/0409516 | A1* | 12/2021 | Saraf ................... H04L 67/131 |
| 2022/0221716 | A1 | 7/2022 | Welch et al. |
| 2022/0398798 | A1 | 12/2022 | Baradaran |

OTHER PUBLICATIONS

International Search Report and Written Opinion for International Application No. PCT/US2023/028717, dated Nov. 8, 2023 (Aug. 11, 2023)—10 pages.

* cited by examiner

CHARACTER AND COSTUME ASSIGNMENT FOR CO-LOCATED USERS

TECHNICAL FIELD

The present disclosure relates to augmented reality (AR) applications for mobile devices. More particularly, but not by way of limitation, the present disclosure describes techniques for using body tracking and AR technologies to assign characters to co-located participants in an AR session and to decorate bodies of the co-located participants with virtual costumes.

BACKGROUND

Body tracking technology has been adapted to track the bodies of users of mobile devices and to identify gestures of the users for purposes of providing gesture inputs to software applications running on the mobile devices. The cameras of the mobile devices may be adapted to detect a gesture in an image and to process the gesture to identify the event that is to be triggered in the software application in response to the gesture. For example, the camera may recognize that a person in the image is showing one finger and then select a corresponding option from a menu of the software application. For gesture detection, the biometric components of the mobile device may include components to detect expressions (e.g., hand expressions, facial expressions, body gestures, eye tracking, and the like) based on images taken by the camera of the mobile device. However, conventional body tracking technology does not provide an identity for the track tracking of different bodies within an image whereby the tracked bodies may be identified within the context of the software application running on the mobile device.

BRIEF DESCRIPTION OF THE DRAWINGS

Features of the various implementations disclosed will be readily understood from the following detailed description, in which reference is made to the appended drawing figures. A reference numeral is used with each element in the description and throughout the several views of the drawing. When a plurality of similar elements is present, a single reference numeral may be assigned to like elements.

The various elements shown in the figures are not drawn to scale unless otherwise indicated. The dimensions of the various elements may be enlarged or reduced in the interest of clarity. The several figures depict one or more implementations and are presented by way of example only and should not be construed as limiting. Included in the drawing are the following figures.

DETAILED DESCRIPTION

Figure 1:
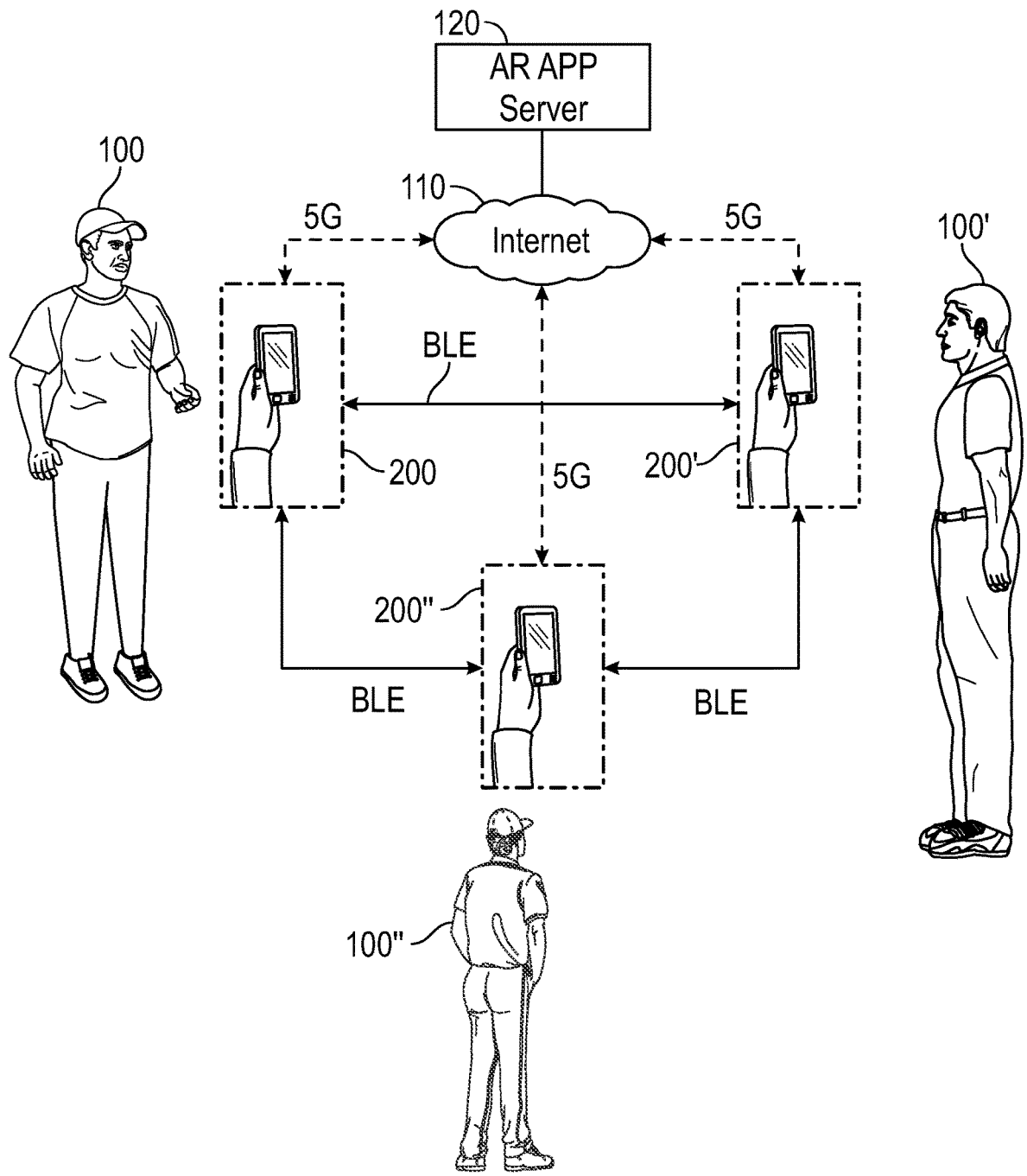
FIG. 1 is a diagram illustrating multiple participants of a co-located augmented reality (AR) session in a sample configuration.

An AR application for assigning characters and costumes in a multi-player co-located AR experience assigns characters and costumes to respective participants (a.k.a. "users" of AR-enabled mobile devices) in the multi-player AR sessions for storytelling, play acting, and the like. Body tracking technology and augmented reality (AR) software are used to decorate the bodies of the co-located participants with virtual costumes within the context of the multi-player co-located AR experiences.

However, currently, there is no way to distinguish which tracked body belongs to which user and hence which virtual costume belongs to which tracked body. As a result, there has been no way in the context of a multi-player software application such as a multi-player AR application to distinguish multiple bodies of co-located participants in a multi-player AR session to enable AR overlays such as personalized costumes to be overlayed on respective participants in the multi-player AR session. This limitation is addressed by providing a host-guest mechanism for networked assignment of characters in a co-located multi-player AR session and by further providing a method for associating detected bodies with their corresponding users' costumes in augmented reality. Body tracking technology is used to move the costume with the body as movement of the assigned body is detected. The resulting methods combine body tracking technology and multi-player co-located AR experiences to provide an AR environment in which users may be assigned characters and corresponding costumes.

As an example of a multi-player co-located AR experience, it is assumed that Alice and Bob have mobile devices adapted to implement the methods described herein. Alice and Bob are example guests of the multi-player co-located AR session in a number of scenarios.

To set up the multi-player co-located AR experience, characters are first assigned to Alice and Bob. To do so, a host of the AR session points the AR camera of her mobile device at Alice, who will be assigned the character "Alpha." The host asks Alice to wave or to perform some other predetermined gesture to indicate that she is ready for character assignment. The host's mobile device detects Alice's gesture and triggers (e.g., through a tap on the screen) assignment of character "Alpha" to Alice. The host's mobile device then broadcasts the character assignment event to the mobile devices of all participants in the multi-player co-located AR session, along with Alice's user ID. Each mobile device in the multi-player co-located AR session is now able to map Alice's user ID to character "Alpha." Each participant's mobile device (except Alice's) may now perform costume decoration (explained below), where Alpha's costume is decorated on top of Alice's body in augmented reality. The same process may be followed for each other co-located participant in the multi-player co-located AR session.

Once the characters have been assigned, the participants in the multi-player co-located AR session next may be assigned AR costumes corresponding to the assigned characters. To do so, each participant's mobile device iterates through the list of participants (other than that participant) in the multi-player co-located AR session. For each participant (suppose Alice, who is assigned the character Alpha), the screen-space position of their mobile device is obtained from the perspective of the current participant. The screen-space head position of all detected bodies in the scene are also obtained. The closest body to Alice's mobile device in terms of the screen-space distance is chosen and identified as Alice's body. The body mesh of Alice's character (Alpha) is retrieved. The parent of the body mesh is set to the tracked body of Alice, and the body mesh's Body Index is changed to match the Object Index of Alice's tracked body. The same process may be followed for each other co-located participant in the multi-player co-located AR session. Once all characters and costumers have been assigned, the multi-player co-located AR session may proceed whereby each participant may see each other co-located participant with his or her AR costume overlayed over the participant's body.

The system described herein thus provides a method for assigning a character to at least one participant in a multi-party augmented reality (AR) session including at least two co-located session participants. The multi-party session enables all session participants to communicate with one another using respective mobile devices. In a sample configuration, the method includes receiving an indication from the AR session that a character is to be assigned to the at least one participant in the multi-party AR session, receiving a character assignment trigger event for assignment of the character, obtaining a user ID of the participant in the multi-party AR session who provided the character assignment trigger event, and assigning the character to the participant in the multi-party AR session who provided the character assignment trigger event. The character assignment of the character to the participant in the multi-party session who provided the character assignment trigger event may be broadcast to the at least two co-located session participants. Each mobile device for each co-located participant may then map the user ID to the assigned character.

After receiving the indication from the AR session that the character is to be assigned to the at least one participant in the multi-party AR session, a message may be sent to at least one participant in the multi-party AR session to which a character has not been previously assigned that the character may be assigned to the at least one participant if the participant provides a predetermined gesture such as a waving gesture.

In sample configurations, obtaining the user ID of the co-located session participant who provided the character assignment trigger event may include capturing a screen-space position of a head of the co-located session participant who provided the character assignment trigger event, comparing the captured screen-space position of the head of the co-located session participant who provided the character assignment trigger event to a screen-space position of each co-located session participant, and determining a user ID of the co-located session participant who is closest to the screen-space position of the head of the co-located session participant who provided the character assignment trigger event.

The method may further include assigning a virtual costume to the participant in the multi-party AR session who provided the character assignment trigger event by obtaining a screen-space position of a mobile device of the participant in the multi-party AR session who provided the character assignment trigger event and determining if a body that has not been assigned a virtual costume is detected in a view of the camera. For each body in the view of the camera that has not been assigned a virtual costume, a screen-space position of a head of the body may be obtained. If the screen-space position of the head of the body is closest to the screen-space position of a mobile device of the participant in the multi-party AR session who provided the character assignment trigger event, the body having the closest screen-space position to the mobile device of the participant in the multi-party AR session who provided the character assignment trigger event is assigned as the body of the participant in the multi-party AR session who provided the character assignment trigger event.

In sample configurations, the body of the participant in the multi-party AR session who provided the character assignment trigger event may be tracked. A body mesh corresponding to the virtual costume of the character may be retrieved and set to the tracked body of the participant in the multi-party AR session who provided the character assignment trigger event. The character assignment of the virtual costume to the participant in the multi-party session who provided the character assignment trigger event may be broadcast to the at least two co-located session participants.

In the sample configurations, determining if the screen-space position of the head of the body is closest to the screen-space position of a mobile device of the participant in the multi-party AR session who provided the character assignment trigger event may be determined by (a) obtaining session data relating to a first participant from a list of co-located participants in the multi-party AR session, (b) determining a screen-space position of the first participant, (c) comparing the screen-space position of the head of the participant in the multi-party AR session who provided the character assignment trigger event to the screen-space position of the first participant, and (d) repeating steps (a)-(c) for each co-located participant in the multi-party AR session. Determining if the screen-space position of the head of the body is closest to the screen-space position of a mobile device of the participant in the multi-party AR session who provided the character assignment trigger event may further include determining the user ID of the closest co-located participant.

The following detailed description includes systems, methods, techniques, instruction sequences, and computer program products illustrative of examples set forth in the disclosure. Numerous details and examples are included for the purpose of providing a thorough understanding of the disclosed subject matter and its relevant teachings. Those skilled in the relevant art, however, may understand how to apply the relevant teachings without such details. Aspects of the disclosed subject matter are not limited to the specific devices, systems, and methods described because the relevant teachings can be applied or practiced in a variety of ways. The terminology and nomenclature used herein is for the purpose of describing particular aspects only and is not intended to be limiting. In general, well-known instruction instances, protocols, structures, and techniques are not necessarily shown in detail.

The term "connect," "connected," "couple," and "coupled" as used herein refers to any logical, optical, physical, or electrical connection, including a link or the like by which the electrical or magnetic signals produced or supplied by one system element are imparted to another coupled or connected system element. Unless described otherwise, coupled, or connected elements or devices are not necessarily directly connected to one another and may be separated by intermediate components, elements, or communication media, one or more of which may modify, manipulate, or carry the electrical signals. The term "on" means directly supported by an element or indirectly supported by the element through another element integrated into or supported by the element.

Additional objects, advantages and novel features of the examples will be set forth in part in the following description, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

Reference now is made in detail to the examples illustrated in the accompanying drawings and discussed below. A sample system and method for assigning characters and costumes to co-located participants in a multi-party AR session will be described with respect to FIGS. 1-6.

As described in related U.S. patent application Ser. No. 17/901,483 (titled Co-Located Full-Body Gestures, filed on even date herewith, which is incorporated fully herein by reference; in a co-located augmented reality (AR) session, full-body gestures (waving, jumping, kicking, etc.) can be a useful interaction method. In an example scenario, Alice and Bob are both in a multi-player co-located AR session and holding their mobile devices toward each other. Existing body tracking technology enables detecting body gestures, but Alice's mobile device cannot detect her own body gestures (because Alice's mobile device does not have a full camera view of her body when held in front of her with her hand). In this scenario, only Bob's camera of Bob's mobile device can detect Alice's body gestures. However, there is no mechanism on Bob's mobile device to recognize that the gesture is the gesture of Alice and to instruct Alice's mobile device that she has performed a full body gesture so that software on Alice's mobile device may respond accordingly. Thus, a mechanism is needed for enabling a body gesture detected on a secondary mobile device (in this scenario, Bob's mobile device) to be associated back to the mobile device of the user that triggered the gesture (in this scenario, Alice's mobile device). Accordingly, a process is described herein for detecting full-body gestures corresponding to a gesture event, determining which user triggered the gesture event, and propagating the gesture event among co-located participants. As will be explained further below, this gesture event may be used to identify a participant for purposes of assigning a character and a costume to each participant in the multi-party co-located AR session.

In a sample configuration, waving may be provided as an example of a full-body gesture. In the sample configuration, a host mobile device detects the tracked body of a co-located participant in a multi-party session. The participant's tracked body begins to wave, and the host's mobile device recognizes that there is a tracked body waving. The host mobile device iterates through the list of co-located participants in the multi-party session and finds the closest participant mobile device with respect to the screen-space position of the waving body's head. The host mobile device then obtains the user ID of the closest participant mobile device. The host mobile device may then broadcast the recognized full-body gesture event (waving by session participant) to all co-located participants in the multi-party session, along with the obtained user ID. Each participant's mobile device may then handle the gesture event as appropriate for the multi-party session. For example, as described below with respect to FIGS. 5 and 6, the mobile device of each participant may assign a character to the recognized participant and then assign an AR costume that is overlaid over that participant in the screen view of each other co-located participant's mobile device.

FIG. 1 is a diagram illustrating multiple participants 100, 100', and 100" of a multi-party co-located augmented reality (AR) session in a sample configuration. While three participants are illustrated, the multi-party co-located AR session may include from two to as many participants as can be supported by the AR session software (e.g., 64 participants). Each participant 100, 100', and 100" has a mobile device 200, 200', and 200", respectively, that the participant 100, 100', and 100" uses to participate in the co-located AR session. As illustrated, each mobile device 200, 200', and 200" communicates with each other co-located mobile device 200, 200', and 200" using, for example, BLUETOOTH® Low Energy (BLE) or any other appropriate local area communications technologies. During the multi-party co-located AR session, each participant 100, 100', and 100" may share one or more AR applications with each other participant 100, 100', and 100". In addition, each mobile device 200, 200', and 200" may be wirelessly connected to the Internet 110 using a suitable broadband cellular network technology (e.g., 5G) and enabled to communicate with a remote AR application server 120 that may provide the AR applications for the multi-party co-located AR session. For example, the AR application server 120 may provide AR applications such as Lenses of the type available from Snap, Inc. of Santa Monica, CA to be shared amongst the mobile devices 200, 200', and 200" during the multi-party co-located AR sessions. The following description will utilize Lenses as an example of AR applications that may be used in a multi-party co-located session as described herein; however, those skilled in the art will appreciate that other AR applications or other multi-party applications may be similarly shared in multi-party AR sessions as described herein.

AR application server 120 may comprise one or more computing devices as part of a service or network computing system, which includes a processor, a memory, and network communication interface to communicate over the Internet 110 with the mobile devices 200, 200', and 200". In sample configurations, one or more of the mobile devices 200, 200', and 200" also may be paired with an electronic eyewear device (not shown) via a high-speed wireless connection. The AR application server 120 may store a gallery of snapshots and AR objects that are maintained by the AR application server 120 for access by each participant 100, 100', and 100" and invoked by Internet communications providing links to the stored snapshots and AR objects in the gallery.

In a sample configuration, a multi-party AR session may be created for co-located participants 100, 100', and 100" by invoking a connection template of the type available, for example, from Snap, Inc. of Santa Monica, CA. The connection template allows users of a social media network such as SNAPCHAT® available from Snap, Inc. of Santa Monica, CA to join with social media friends to share a common AR application in a common AR space at the same location or remotely. The connection template may include a re-usable invitation flow that manages how users join an AR session with their social media friends and a relay system that enables the participants 100, 100', and 100" in the AR session to pass messages amongst themselves. An avatar system also may be provided to provide a co-presence when one or more of the participants 100, 100', or 100" are not co-located with the other participants 100, 100', and 100" in the shared AR session. In sample configurations, the connection template also may provide examples of synchronizing object instantiation and transform manipulation within a shared AR session.

In an example, a shared multi-party AR session may implement a shared AR application such as Connected Lenses available from Snap, Inc. of Santa Monica, CA. Connected Lenses are a type of Lens that allows participants in a shared session to pass and stored data between mobile devices 200, 200', and 200" that are running the same Lens, whether the mobile devices 200, 200', and 200" are co-located or in different locations. Connected Lenses thus allow the participants 100, 100', and 100" to create AR experiences that social media friends can experience together at the same time and return to over time. Sample AR experiences may permit the participants 100, 100', and 100" to instantiate objects, modify the position/rotation/scale of an object that is synchronized across mobile devices 200, 200', and 200", as well as to send messages amongst the participants 100, 100', and 100". When the participants 100, 100', and 100" are co-located, the participants 100, 100', and 100" may reference the same co-located AR experience on their respective mobile devices 200, 200', and 200". To invite social media friends to such a co-located AR experience, a participant 100, 100', or 100" may first map the area and then, in the case of Connected Lenses, the Lens can show a code (e.g., Snapcode) that the other participants 100, 100', and 100" can scan to join the co-located AR experience. The mapped area does not provide the geometry of the scene but allows the participants 100, 100', and 100" to share the same coordinate frame with the other participants 100, 100', and 100". A single AR application such as a Lens may contain a single-user experience, a remote experience, or a co-located experience, as desired by the participants 100, 100', and 100".

In the example of a Connected Lens, the Lens may create a multi-party AR session that may be joined by others using a Connected Lens module. Adding the Connected Lens module converts a Lens to a Connected Lens having a Call to Action button that a participant 100, 100', or 100" may tap to enter into a Connected Lens State, at which point a participant 100, 100', or 100" receives the functionality to invite the other participants 100, 100', and 100" into a connected AR session. When a participant 100, 100', or 100" enters a Lens through an invitation, the participant 100, 100', or 100" will enter directly into the Connected Lens State. At this point, each connected participant 100, 100', and 100" will not have access to any camera mode except to change between front and rear cameras. Also, instead of a carousel of Lenses for selection, the participants 100, 100', and 100" will have an Action bar that allows the participant 100, 100', and 100" to see who else is in the connected AR session. Within the connected AR session, each participant 100, 100', and 100" may send a message to every other participant in the connected AR session and receive messages from every other participant in the connected AR session. To facilitate communication, each participant in a connected AR session is assigned a user ID for the connected AR session.

When a participant 100, 100', or 100" first opens a Connected Lens, she is first introduced to a splash screen that introduces the participant 100, 100', or 100" to the current Connected Lens experience and provides her with the option to start interacting with a connected AR session by selecting the Call to Action button to launch the Connected Lens. Once the participant 100, 100', or 100" completes the invitation process, she is brought into the connected AR session where the Lens can send data back and forth between each participant 100, 100', and 100".

It will be appreciated by those skilled in the art that the co-located session may also be shared on electronic eyewear devices such as SPECTACLES™ available from Snap, Inc. of Santa Monica, CA., by setting up a multiplayer session using a Connected Lenses Module to make a Lens usable for multi-party applications.

Figure 2:
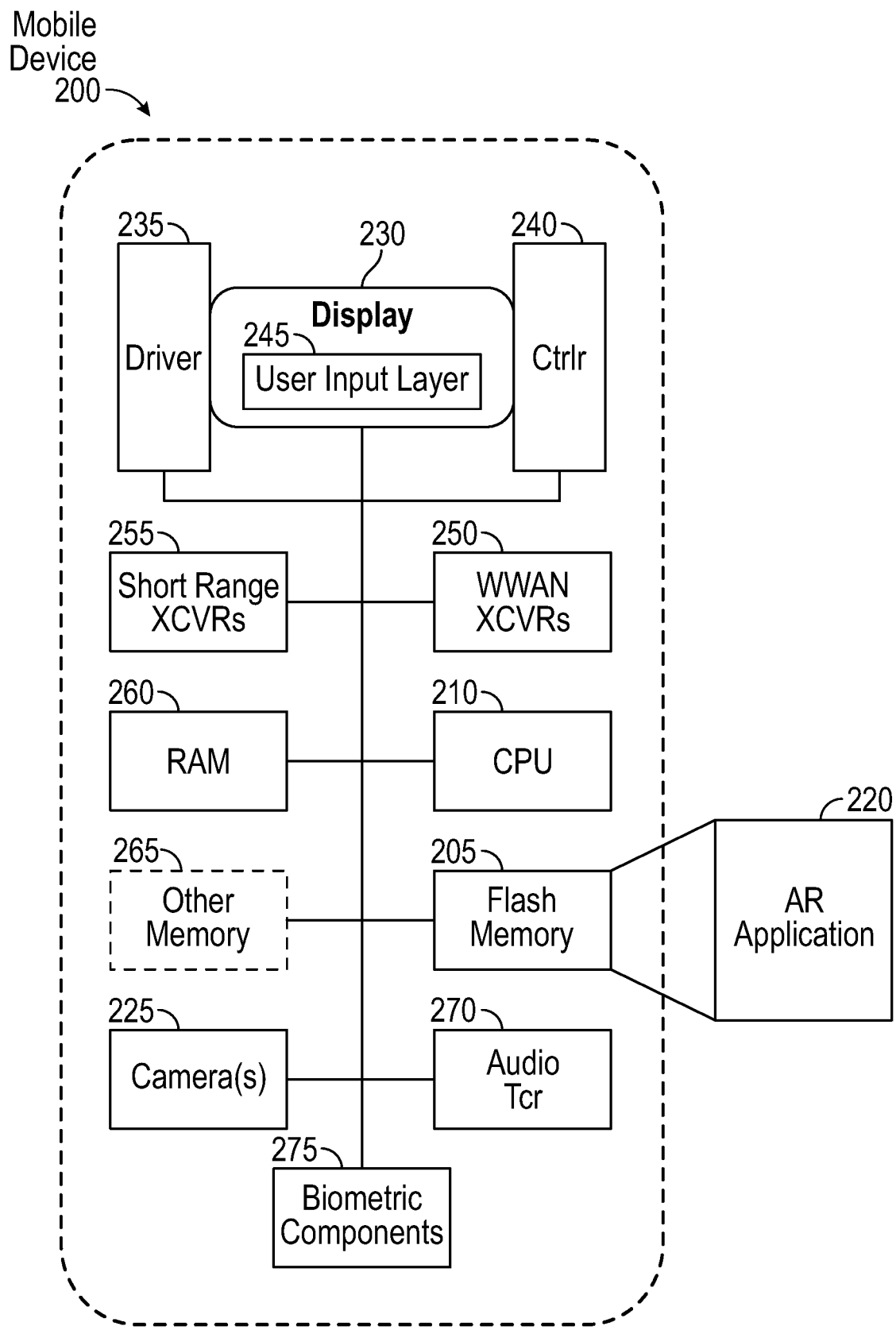
FIG. 2 is a block diagram of the electronic components of a mobile device adapted for implementing co-located AR sessions in a sample configuration.

FIG. 2 is a block diagram of the electronic components of a mobile device 200, 200', or 200" adapted for implementing co-located AR sessions in a sample configuration. Mobile device 200 may present interfaces (e.g., AR interfaces) to a participant 100 and also may be used to extend the interfaces to an associated electronic eyewear device (not shown) in sample configurations. Mobile device 200 may include a flash memory 205 that stores programming to be executed by the CPU 210 to perform all or a subset of the functions described herein. The mobile device 200 may further include a camera 225 that comprises one or more visible-light cameras (visible-light cameras with overlapping fields of view) or at least one visible-light camera and a depth sensor with substantially overlapping fields of view. Flash memory 205 may further include multiple images or video, which are generated via the camera 225.

The mobile device 200 may further include an image display 230, a mobile display driver 235 to control the image display 230, and a display controller 240. In the example of FIG. 2, the image display 230 may include a user input layer 245 (e.g., a touchscreen) that is layered on top of or otherwise integrated into the screen used by the image display 230. Examples of touchscreen-type mobile devices that may be used include (but are not limited to) a smartphone, a personal digital assistant (PDA), a tablet computer, a laptop computer, or other portable device. However, the structure and operation of the touchscreen-type devices is provided by way of example; the subject technology as described herein is not intended to be limited thereto. For purposes of this discussion, FIG. 2 therefore provides a block diagram illustration of the example mobile device 200 with a user interface that includes a touchscreen input layer 245 for receiving input (by touch, multi-touch, or gesture, and the like, by hand, stylus, or other tool) and an image display 230 for displaying content.

As shown in FIG. 2, the mobile device 200 includes at least one digital transceiver (XCVR) 250, shown as WWAN (Wireless Wide Area Network) XCVRs, for digital wireless communications via a wide-area wireless mobile communication network. The mobile device 200 also may include additional digital or analog transceivers, such as short-range transceivers (XCVRs) 255 for short-range network communication, such as via NFC, VLC, DECT, ZigBee, BLUETOOTH®, or WI-FI®. For example, short range XCVRs 255 may take the form of any available two-way wireless local area network (WLAN) transceiver of a type that is compatible with one or more standard protocols of communication implemented in wireless local area networks, such as one of the WI-FI® standards under IEEE 802.11.

To generate location coordinates for positioning of the mobile device 200, the mobile device 200 also may include a global positioning system (GPS) receiver. Alternatively, or additionally, the mobile device 200 may utilize either or both the short range XCVRs 255 and WWAN XCVRs 250 for generating location coordinates for positioning. For example, cellular network, WI-FI®, or BLUETOOTH® based positioning systems may generate very accurate location coordinates, particularly when used in combination. Such location coordinates may be transmitted to the mobile device 200 over one or more network connections via XCVRs 250, 255.

The transceivers 250, 255 (i.e., the network communication interface) may conform to one or more of the various digital wireless communication standards utilized by modern mobile networks. Examples of WWAN transceivers 250 include (but are not limited to) transceivers configured to operate in accordance with Code Division Multiple Access (CDMA) and 3rd Generation Partnership Project (3GPP) network technologies including, for example and without limitation, 3GPP type 2 (or 3GPP2) and LTE, at times referred to as "4G." The transceivers also may incorporate broadband cellular network technologies referred to as "5G." In sample configurations, the transceivers 250, 255 provide two-way wireless communication of information including digitized audio signals, still image and video signals, web page information for display as well as web-related inputs, and various types of mobile message communications to/from the mobile device 200.

The mobile device 200 may further include a microprocessor that functions as the central processing unit (CPU) 210. CPU 210 is a processor having elements structured and arranged to perform one or more processing functions, typically various data processing functions. Although discrete logic components could be used, the examples utilize components forming a programmable CPU. For example, a microprocessor may include one or more integrated circuit (IC) chips incorporating the electronic elements to perform the functions of the CPU 210. The CPU 210 may be based on any known or available microprocessor architecture, such as a Reduced Instruction Set Computing (RISC) using an ARM architecture, as commonly used today in mobile devices and other portable electronic devices. Of course, other arrangements of processor circuitry may be used to form the CPU 210 or processor hardware in a smartphone, a laptop computer, and a tablet.

The CPU 210 serves as a programmable host controller for the mobile device 200 by configuring the mobile device 200 to perform various operations in accordance with instructions or programming executable by CPU 210. For example, such operations may include various general operations of the mobile device 200, as well as operations related to the programming for messaging apps and AR camera applications on the mobile device 200. Although a processor may be configured by use of hardwired logic, typical processors in mobile devices are general processing circuits configured by execution of programming.

The mobile device 200 further includes a memory or storage system for storing programming and data. In the example shown in FIG. 2, the memory system may include flash memory 205, a random-access memory (RAM) 260, and other memory components 265, as needed. The RAM 260 may serve as short-term storage for instructions and data being handled by the CPU 210, e.g., as a working data processing memory. The flash memory 205 typically provides longer-term storage.

In the example of mobile device 200, the flash memory 205 may be used to store programming or instructions for execution by the CPU 210. Depending on the type of device, the mobile device 200 stores and runs a mobile operating system through which specific applications are executed. Examples of mobile operating systems include Google Android, Apple iOS (for iPhone or iPad devices), Windows Mobile, Amazon Fire OS (Operating System), RIM BlackBerry OS, or the like.

The mobile device 200 also may include an audio transceiver 270 that may receive audio signals from the environment via a microphone (not shown) and provide audio output via a speaker (not shown). Audio signals may be coupled with video signals and other messages by a messaging application or social media application implemented on the mobile device 200.

In sample configurations, the mobile device 200 may further include biometric components 275 to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components may include acceleration sensor components (e.g., accelerometer), gravitation sensor components, rotation sensor components (e.g., gyroscope), and so forth. The position components may include location sensor components to generate location coordinates (e.g., a Global Positioning System (GPS) receiver component), WI-FI® or BLUETOOTH® transceivers to generate positioning system coordinates, altitude sensor components (e.g., altimeters or barometers that detect air pressure from which altitude may be derived), orientation sensor components (e.g., magnetometers), and the like. Such positioning system coordinates also can be received from other devices over wireless connections.

In sample configurations, the mobile device 200 may execute mobile augment reality (AR) application software 220 such as SNAPCHAT® available from Snap, Inc. of Santa Monica, CA that is loaded into flash memory 205. As will be described in more detail below with respect to FIGS. 3-4, the mobile AR application software 220 may be executed to create a multi-party session, detect full-body gestures of a participant, determine which session participant triggered the gesture event, and propagate the gesture event among co-located participants in the multi-party session. In sample configurations, the gesture event may be used to assign a character to the identified participant and to assign a corresponding AR costume to that participant as described below with respect to FIGS. 5-6, whereby other co-located participants in the multi-party session may see corresponding AR costumes overlaid over each other co-located participant in her camera view.

Figure 3:
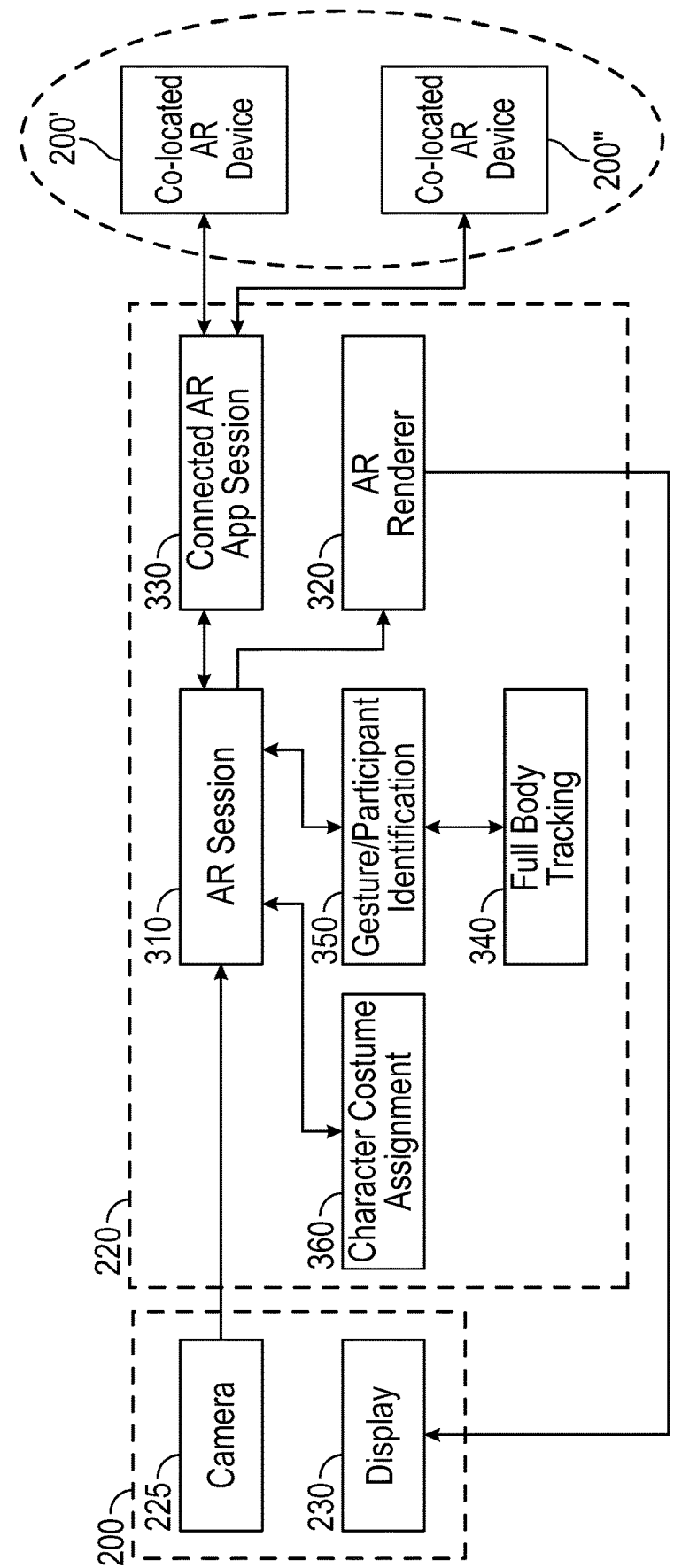
FIG. 3 is a block diagram of the software components for implementing a co-located AR session on the mobile device of FIG. 2 in a sample configuration.

FIG. 3 is a block diagram of the software components for implementing an AR session on the mobile device 200 of FIG. 2 in a sample configuration. As illustrated, the mobile device 200 executes AR application 220 to implement an AR session 310 that is rendered by an AR renderer 320 to the display 230 of the mobile device 200. The AR session 310 may be implemented as a connected AR app session 330 such as a Connected Lens session described above. The connected AR app session 330 controls communications with the other co-located AR devices including mobile device 200' and 200" in the co-located session described with respect to FIG. 1. The Connected Lens in the connected AR app session 330 may function to overlay one or more shared Lenses on the images received from camera 225 of the respective mobile devices 200, 200', and 200" of each participant 100, 100', and 100" in the connected AR app session 330.

In sample configurations, the AR application 220 further implements full body tracking software 340 and gesture/participant identification software 350 during an AR session. Full body tracking software 340 may implement three-dimensional (3D) body templates that allow a participant 100, 100', or 100" to track the position and rotation of joints of a body in 3D in an image captured by the camera 225. One or more bodies may be tracked at the same time, as well as partial bodies. In sample configurations, a 3D model may be rigged to a skeleton that matches what the full body tracking software 340 sees in the image from the camera 225. This allows the AR application (e.g., Lens) to map the movement of a body to the movement of the model.

The 3D rigged model may be based on a stick figure with joints corresponding to the feet, knees, hips, shoulders, spine, neck, head, elbows, hands, and the like of a person. The 3D rigged model assigns all of the joints of the person in the image from the camera 225 to the 3D rigged model for use by the 3D body tracking software 340. The 3D body tracking software 340 then tracks movement of the person in the image from the camera by moving the 3D rigged model with the person as the person moves. Proportions of the 3D rigged model may be adjusted as appropriate to fit the person in the image from the camera 225.

When the camera 225 captures overlapping images of more than one person, it may be impossible to know the position of invisible parts of the body. In this case, the 3D body tracking software 340 may disable or hide the joints that are not being tracked automatically. Individual objects, such as AR objects in the form of Lenses, for example, also may be attached to the tracked body by attaching the AR objects to the individual joints of the person in the image.

To identify gestures performed by the person in the image, a full body trigger template may be implemented that allows different screen effects to be triggered by different body movements, such as custom body gesture (e.g., waving), touch screen triggers and distance between body joints, or a distance between body joints and screen elements identified in a screen transform. The full body trigger template may implement a full-body tracking system for tracking full-body gestures, an upper body tracking system for tracking upper body gestures, or a lower body tracking system for tracking lower body gestures, as appropriate. The full-body tracking system may also track facial features by providing access to face points such as nose, left and right eyes, and left and right ears. The trigger template further specifies what should happen in a corresponding AR application (e.g., Connected Lens) when a trigger event is identified. The triggered event may be a full screen effect, visual effects attached to the body, toggling of an object, playing of an animation, or anything else that may be elicited within the AR application by the trigger event.

In sample configurations, the full body tracking software 340 provides 2D screen points that represent the joints or parts of the body of a person identified in an image and is the basis of the full body tracking template. Sample body movements may include a T pose, a right foot click, a wave, and the like. Each body movement may have a movement trigger script attached to it that allows different movement types to be attached, including a gesture. Each gesture may be composed by a list of pose triggers (e.g., right leg out or right leg click for a right foot click trigger). When a pose is matched to a person in the camera image, the list of behavior triggers is called and matched to the pose. When the pose is matched to a behavior trigger, the corresponding gesture event is activated. The pose may be a movement, such as a wave, which triggers a movement trigger response script to implement the gesture event.

For example, a particular body movement by the person in the image may trigger a character assignment and a costume assignment. To do so, the AR session may initiate a procedure to assign characters and costumes for the participants in the current AR session. A first character may be assigned to one or more participants who provide a predetermined gesture (e.g., a waving hand) for assignment of a particular character. The full-body tracking software 340 of a host mobile device tracks the co-located participants in the camera view and the gesture/participant identification software 350 determines that one or more co-located participants has provided the predetermined gesture. The gesture event and the user IDs of the participant(s) who performed the predetermined gesture are provided to the AR session 310 for assignment of the character. The user ID(s) are then provided to the character/costume assignment software 360 for assignment of the character and the corresponding costume. As described below with respect to FIGS. 5-6, this process may be repeated until all characters and costumes have been assigned.

Figure 4:
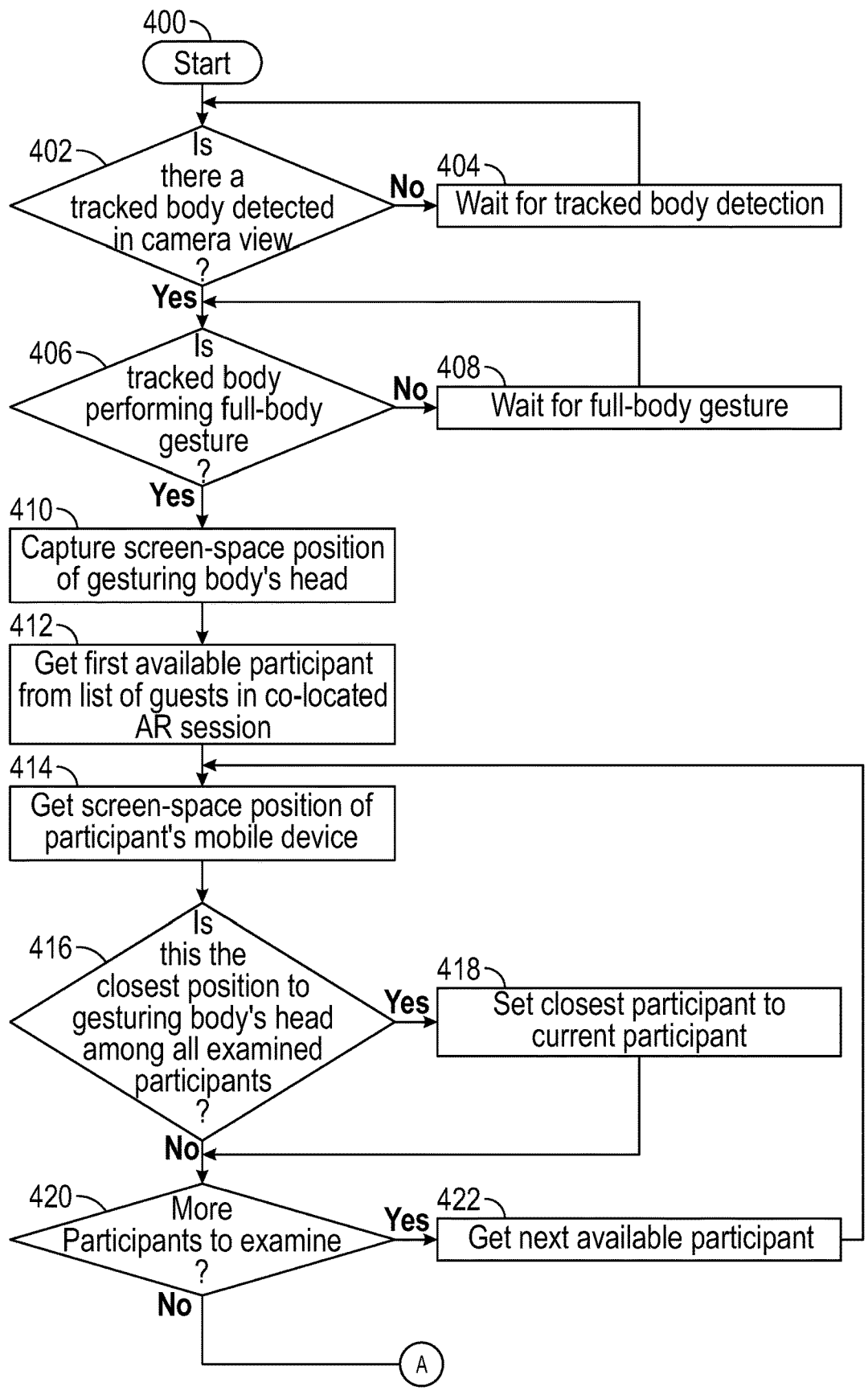
FIG. 4 is a flow chart of a method for detecting a full body gesture, determining which participant made the full body gesture, and propagating the detected gesture to other co-located participants of a multi-party AR session in a sample configuration.
Figure 4:
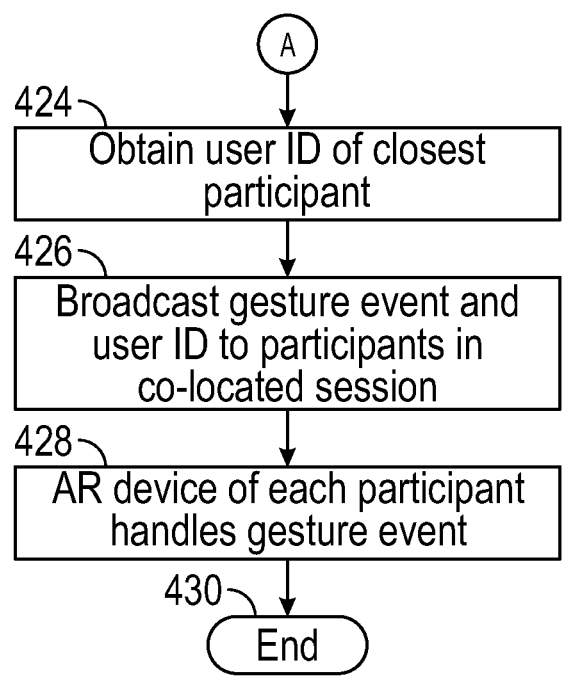

Operation of the gesture/participant identification software 350 for identifying a full-body gesture and the participant who performed the gesture is shown in FIG. 4, which is a flow chart of a method for detecting a full body gesture, determining which participant made the full body gesture, and propagating the detected gesture to other co-located participants of a co-located AR session in a sample configuration.

In sample configurations, the method of FIG. 4 is implemented by the gesture/participant identification software 350 illustrated in FIG. 3. As shown in FIG. 4, the method starts at 400 by determining at 402 if there is a tracked body detected by the full body tracking software 340 in the image received from camera 225 of the mobile device 200. If no tracked body is detected at 402, the process proceeds to 404 to wait for detection of a tracked body. Once a tracked body is detected at 402, a determination is made at 406 as to whether the tracked body is performing full-body gestures. As noted above, full-body gestures such as waving, jumping, or kicking may be detected from movements of the body model that is paired with the received image. If no full-body gesture is detected at 406, the process proceeds to 408 to wait for detection of a full-body gesture. Once a full-body gesture is detected at 406, a screen-space position of the head of the gesturing body is captured at 410.

Once the screen-space position of the head of the gesturing body has been captured at 410, the captured screen-space position of the head of the gesturing body is compared to the screen-space position of each co-located participant in a multi-party session. In particular, the first available participant is obtained from a list of co-located participants in the multi-party AR session at 412. At 414, the screen-space position of the participant's mobile device 200, 200', or 200" is obtained from the session data and compared to the screen-space position of the head of the gesturing body. If the screen-space position of the current participant's mobile device 200, 200', or 200" is determined at 416 to be closer than the screen-space position of any other participant in the AR session, then at 418 the variable "closest participant" is set to the user ID of the current participant. If it is determined at 420 that there are other participants in the AR session that have not yet been examined for proximity to the screen-space position of the head of the gesturing body, then the data for the next available participant is obtained at 422, and steps 414-422 are repeated until all participants in the AR session have been evaluated for proximity to the screen-space position of the head of the gesturing body.

Once all participants in the AR session have been evaluated, the user ID of the closest participant to the head of the gesturing body is obtained at 424. The captured gesture event (e.g., wave, jump, or kick) is then broadcast at 426 to the other participants in the co-located AR session along with the user ID of the participant that generated the gesture event. At 428, each AR device 200, 200', and 200" for each participant 100, 100', and 100" in the AR session handles the gesture event as appropriate given the nature of the gesture event and the user ID of the person who generated the gesture event. The process then ends at 430.

Figure 5:
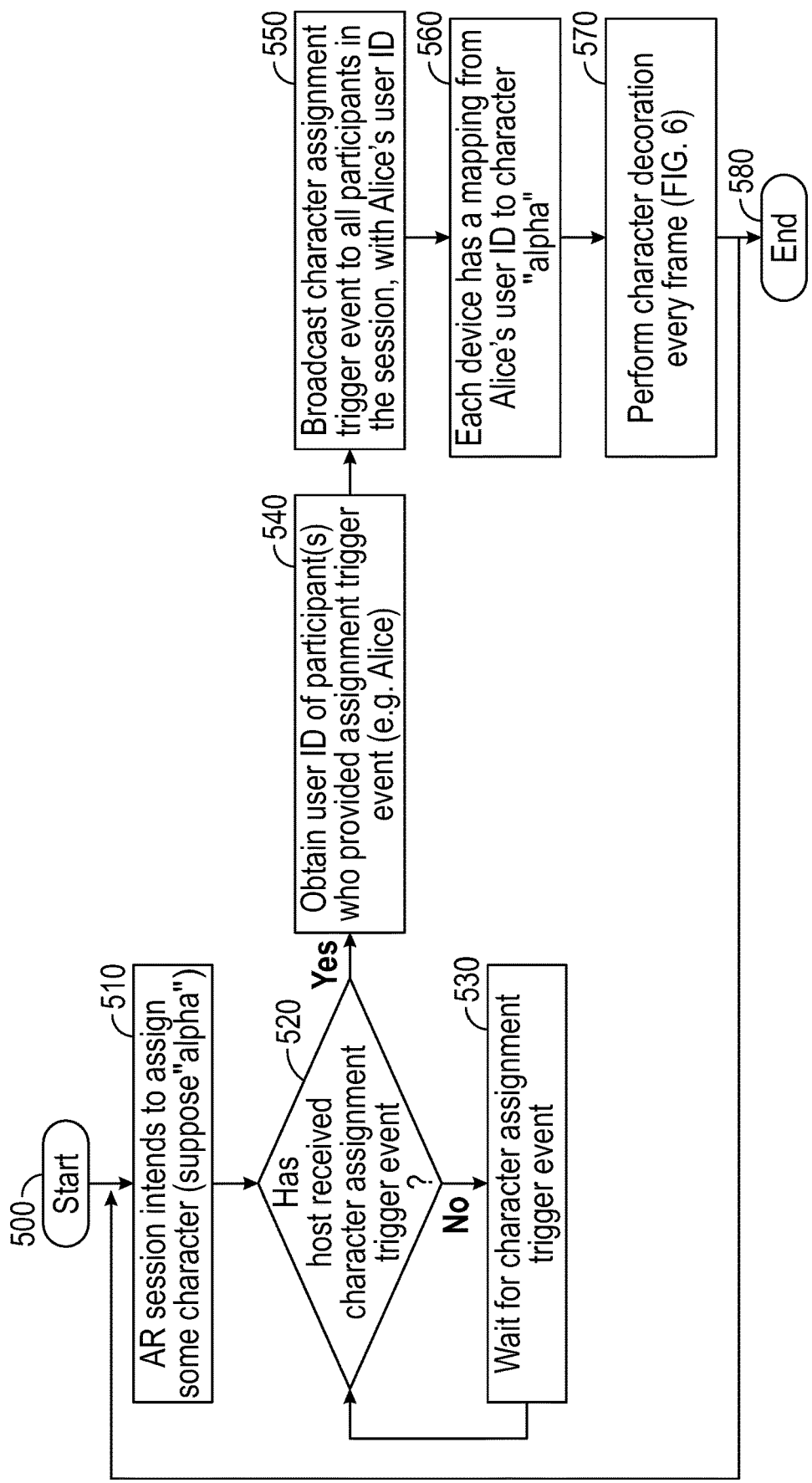
FIG. 5 is a flow chart of a method for assigning characters to co-located participants in a multi-player software application in a sample configuration.

Once the gesture event and the user ID of the person who generated the gesture event are so determined, the AR session 310 may call character/costume assignment software 360 to assign characters and costumes to the respective co-located participants of the multi-party AR session. FIG. 5 a flow chart of a method implemented by the character/costume assignment software 360 (FIG. 3) for assigning a character to co-located participants in a multi-party AR session in a sample configuration.

As shown in FIG. 5, the character/costume assignment process starts at 500 by determining at 510 that the AR session software 310 intends to assign a character (e.g., character "Alpha"). For example, the character/costume assignment software 360 may receive an ID for character "Alpha." The AR session software 310 also may send a message to each co-located participant in the multi-party session asking each participant to perform a predetermined gesture (e.g., a hand wave) in order to be assigned a designated character. The session software 310 may then wait for an indication by the gesture/participant identification software 350 that a co-located participant has provided the predetermined gesture for character assignment. Upon receipt of the user ID of each co-located participant that provided the predetermined gesture, the character/costume assignment software 360 is notified that a character assignment trigger event has been received. When a character assignment trigger event has been received at 520, the user ID of the participant(s) who provided the predetermined gesture and thus provided the assignment trigger event is obtained at 540. Otherwise, the character/costume assignment software 360 waits at 530 for the assignment trigger event.

Once the user ID of the participant(s) who provided the assignment trigger event has been obtained at 540, the character assignment trigger event is broadcast to all co-located participants in the multi-party AR session at 550. For example, if Alice raised her hand to be assigned character "Alpha," Alice's user ID for character "Alpha" is obtained at 540 and it is broadcast to all participants in the multi-party session at 550 indicating that Alice has been assigned character Alpha by providing Alice's user ID for association with the ID for character "Alpha." At 560, each mobile device of each co-located participant in the multi-party AR session stores a mapping of Alice's user ID to the ID for the character "Alpha." Once Alice has been associated with character "Alpha," when Alice is identified in the camera view of the AR camera of any other co-located participant in the multi-party session, Alice's body is overlaid with a corresponding character decoration for character "Alpha" at 570 (described in more detail with respect to FIG. 6 below). The character decoration is updated for every frame so long as Alice's body remains in the camera view of the AR camera of any of the other co-located participants in the multi-party session. The process of FIG. 5 may be repeated for each participant in the multi-party AR session to which a character is to be assigned. The process ends at 580.

It will be appreciated by those skilled in the art that the character/costume assignment process described with respect to FIG. 5 associates a character and a costume with a mobile device of a participant in the multi-party session and assumes the user ID of the participant associated with that mobile device. As is apparent from the gesture/participant identification process of FIG. 4, the gesture for accepting the character is associated with the closest body from the perspective of the host's mobile device and hence the character and costume are associated with user ID of the mobile device that is closest to the body of the gesturing participant from the perspective of the host's mobile device. Any body gesture events (such as waving) detected by the gesture/participant identification software 350 may thus be associated with the mobile device of the gesturing participant, and the host may broadcast the user ID of the mobile device of the gesturing participant to all other mobile devices of other co-located participants of the multi-party AR session.

Figure 6:
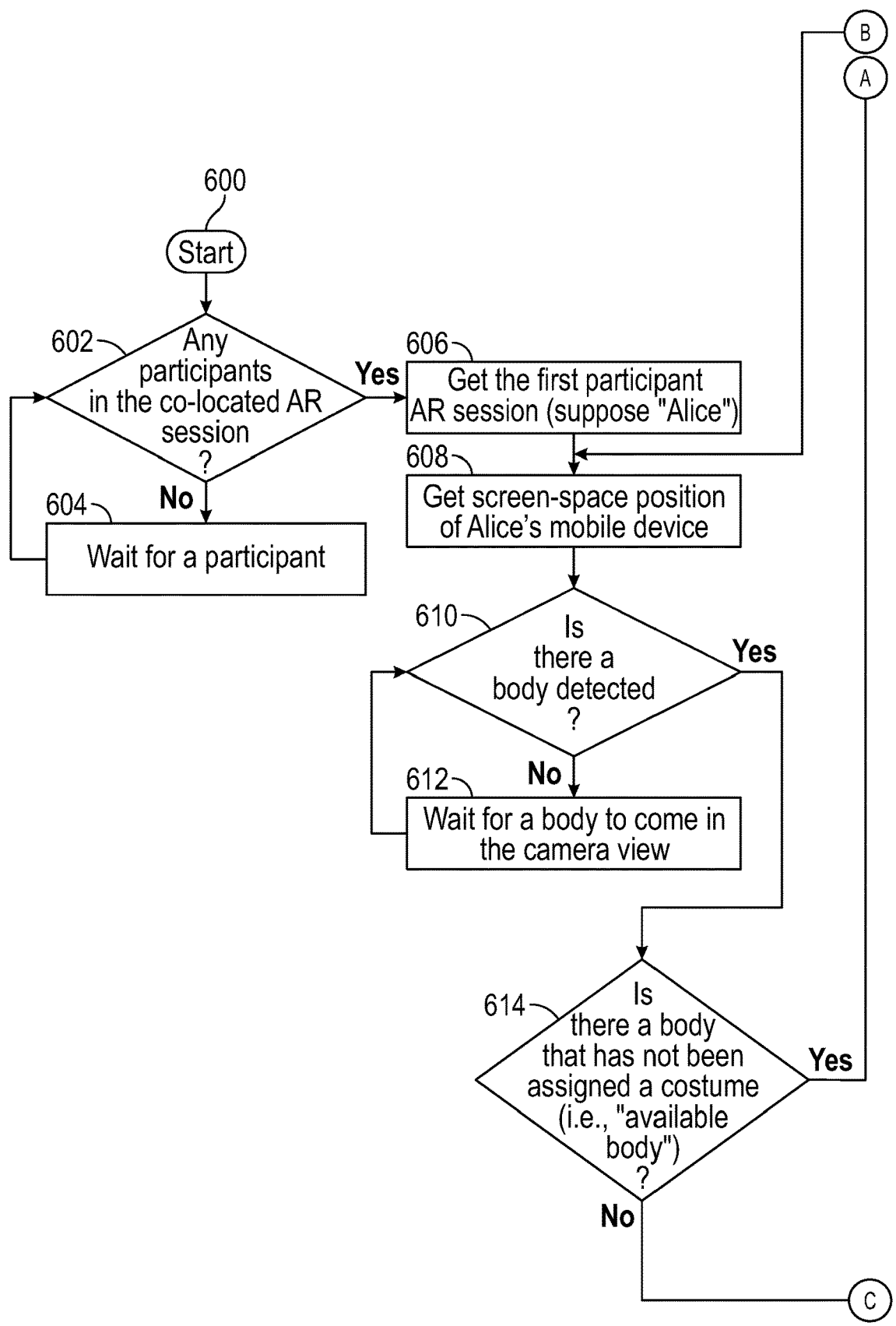
FIG. 6 is a flow chart of a method for decorating co-located participants in a multi-players software application with AR costumes in a sample configuration.
Figure 6:
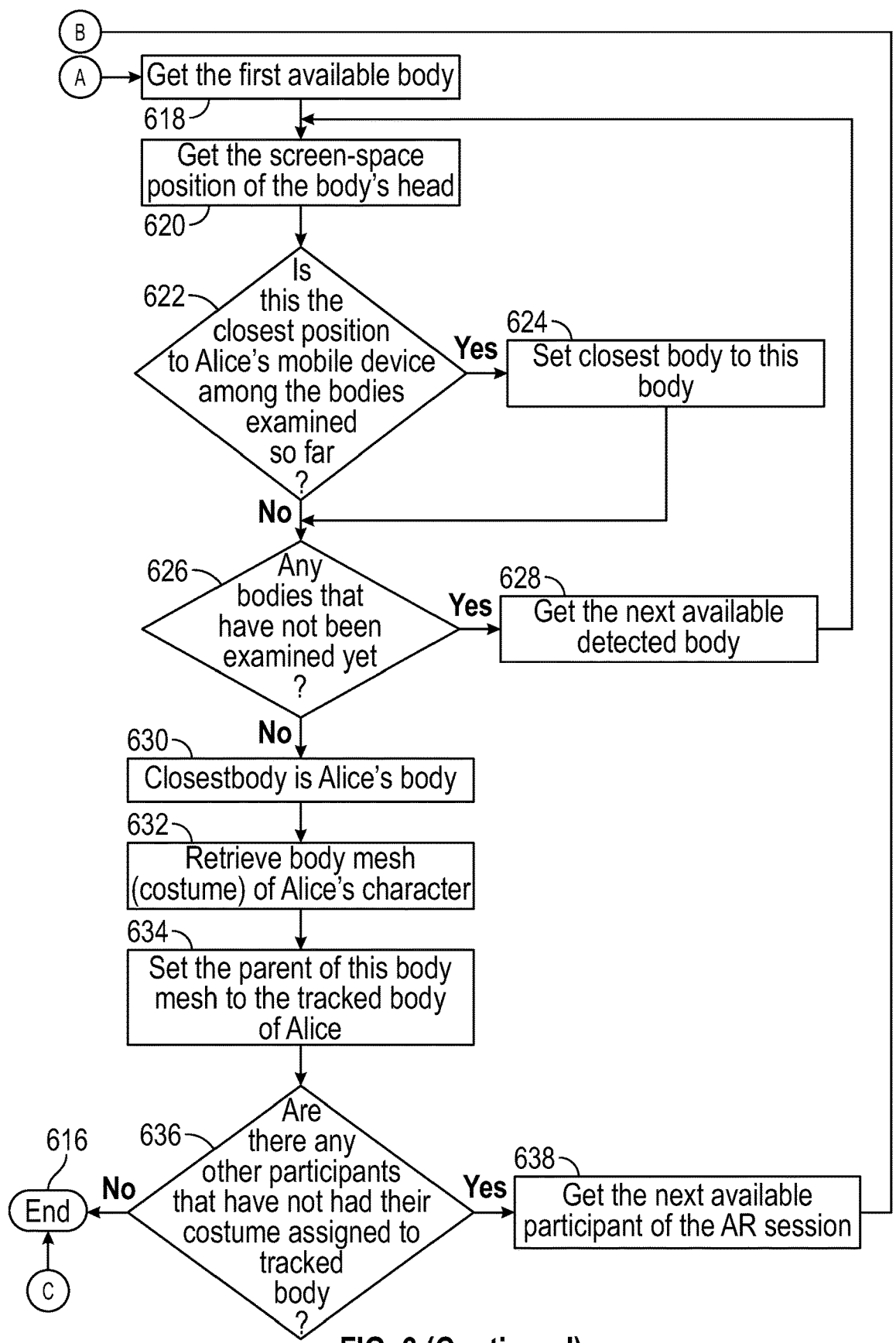

FIG. 6 is a flow chart of a method for decorating co-located participants in a multi-player software application with AR costumes in a sample configuration. As shown in FIG. 6, the method starts at 600 by executing a process on the host's mobile device including determining at 602 if there are any participants in the co-located AR session. If not, the process proceeds to 604 to wait for a participant. Once there is a participant in the co-located AR session, the first participant of the AR session is obtained at 606. If it assumed that the first participant is Alice, the screen-space position of Alice's mobile device is obtained at 608.

At 610, the host mobile device determines whether a body is detected in the camera view. If not, the process proceeds to 612 to wait for a body to come into the camera view. Once a body is detected at 610, a determination is made at 614 whether or not a body has been detected that has not been assigned a costume. If all bodies have been assigned a costume, the process ends at 616. Otherwise, the first available body is obtained at 618, and the screen-space position of the body's head is obtained at 620 using the techniques described above with respect to FIG. 4.

At 622, the screen-space position of the head of the body currently being examined is compared to the screen-space position of the head of other bodies that have been examined so far to determine if the head of the body currently being examined is the closest to Alice's mobile device's screen-space position. If the screen-space position of the current participant's mobile device 200, 200', or 200" is determined at 622 to be closer than the screen-space position of any other participant in the AR session evaluated so far, then at 624 the variable "closest body" is set to the user ID of the body currently being examined. If it is determined at 626 that there are other participants in the AR session that have not yet been examined for proximity to the screen-space position of the head of the body currently being examined, then the data for the next available participant is obtained at 628, and steps 620-626 are repeated until all participants in the AR session have been evaluated for proximity to the screen-space position of the head of the body currently being examined.

Once all participants in the AR session have been evaluated, the user ID of the closest participant to the head of the Alice's body is obtained at 630 (i.e., the variable "closest body" is assigned the user ID of the closest body in the AR session that has been examined). In other words, Alice's body has been identified. The body mesh of the costume of Alice's character is then retrieved at 632, and the parent of the retrieved body mesh is set to the tracked body of Alice at 634. The body mesh's Body Index is changed to match the Object Index of Alice's tracked body. The process then determines at 636 whether there are any other participants in the AR session that have not had their costume assigned to a tracked body. If there are other participants that have not had their costumes assigned to a tracked body, the next available participant of the AR session is obtained at 638, and steps 620-636 are repeated. Once all participants have had their costume assigned to a tracked body, the process ends at 616. The character and costume assignments may be broadcast to all co-located participants in the AR session, along with the user IDs of the mobile devices to which the characters and costumes are assigned.

Each mobile device in the multi-player co-located AR session is now able to map each user ID to the assigned character. Each participant's mobile device may now perform costume decoration by overlaying the assigned AR costumes on top of the bodies of the respective co-located users in the camera view during the course of the AR session. The same process may be followed for each other co-located participant in the multi-player co-located AR session. Thus, in the disclosed examples, a participant in a multi-party co-located AR session may be assigned a character and a costume during an AR session for participation in character driven stories, play acting, and the like.

By way of example, the AR session may assign characters in a story to the participants in the AR session. One of the participants in the AR session may elect to be the host to set up characters for the story. To do so, the host's mobile device broadcasts to the mobile devices of the other co-located participants (e.g., Alice and Bob) in the AR session a message something like: "Waive if you would like to play character Alpha." Alice starts waving. The host's mobile device recognizes the waving gesture, determines that Alice's mobile device is the closest to the body making the waving gesture, and assigns character Alpha to Alice. The character assignment for Alpha may be broadcast to the mobile device of the other co-located participants in the AR session. The character assignment process may be repeated for each character in the story. For example, the host's mobile device may broadcast to the mobile devices of the other co-located participants in the AR session a message something like: "Waive if you would like to play character Beta." Bob starts waving. The host's mobile device recognizes the waving gesture, determines that Bob's mobile device is the closest to the body making the waving gesture, and assigns character Beta to Bob. The character assignment for Beta may be broadcast to the mobile device of the other co-located participants in the AR session. This process may be repeated until all characters have been assigned and/or all co-located participants in the AR session have been assigned a character. Once all characters have been assigned, the AR session may proceed with the AR story.

The mobile devices of the participants that are not the host will see messages indicating that they are waiting for the host to join. Once the host has joined, the participants in the AR session (besides the host) will see a message indicating that the characters are to be assigned for the story. Each such participant will then see the message "Waive if you would like to play character Alpha." Once the host has recognized that Alice is waving, Alice's mobile device is updated with a message indicating that the host knows that she is waving. Alice's mobile device also will be updated with a message indicating that she has been assigned character Alpha. Alice will also see the message "Waive if you would like to play character Beta" and, once the host has recognized that Bob is waving, Alice's mobile device will be updated with a message indicating that the host knows that Bob is waving. Alice's mobile device also will be updated with a message indicating that Bob has been assigned character Beta. Corresponding messages also will be sent to Bob's mobile device and the mobile devices of other co-located participants as appropriate. This process repeats until all characters have been assigned and/or all co-located participants in the AR session have been assigned a character. The mobile devices of all co-located participants besides the host indicate that the mobile devices are waiting for the host to start the AR story. Once all characters have been assigned, the AR session may proceed when the host initiates the AR story.

The host may, of course, assign a character and costume to herself by making selections directly on her mobile device within her AR session. The host's character assignment may be broadcast to the other co-located participants in the AR session. The host also may select the AR story to be broadcast to the other co-located participants for role playing, and the like.

In sample configurations, the costumes assigned in accordance with the techniques described herein may be full body model costumes that are embedded in AR objects such as Lenses available from Snap, Inc. of Santa Monica, CA. The characters and costumes are assigned to mobile devices which are, in turn, associated with a body belonging to one of the co-located participants in an AR session. The position of the mobile devices are, in turn, known by the co-located session, thus facilitating character and costume assignment. Thus, the system tracks mobile devices in the co-located environment to obtain the three-dimension coordinates of each mobile device and each participant in the AR session. The screen-space coordinates of the head of each participant are used to assign a participant to his or her mobile device (also in screen coordinates) based on closeness of the participant's head to a particular mobile device having a user ID known from the session data. It will be appreciated that since the characters and costumes are assigned by the user IDs of the mobile devices, the characters and the costumes travel with the mobile devices and are assigned to the closest participant to the mobile device. In other words, Alice and Bob may switch characters by exchanging mobile devices. Once matched to a body, the joints of the costumes may be mapped to move with the body of the participant to which the costume has been assigned.

Those skilled in the art will further appreciate that the techniques described herein may be further extended to mobile devices in the form of electronic eyewear devices such as SPECTACLES™ available from Snap, Inc. of Santa Monica, CA. In such as case, the messages are presented to the display of the eyewear device, and the cameras of the eyewear device are used to capture the images of the other co-located participants in the AR session. In this case, the location of the eyewear would very closely match the position of the participant's head, thus simplifying the match of the mobile device to the corresponding participant.

Techniques described herein also may be used with one or more of the computer systems described herein or with one or more other systems. For example, the various procedures described herein may be implemented with hardware or software, or a combination of both. At least one of the processor, memory, storage, output device(s), input device (s), or communication connections discussed below can each be at least a portion of one or more hardware components. Dedicated hardware logic components can be constructed to implement at least a portion of one or more of the techniques described herein. For example, and without limitation, such hardware logic components may include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Applications that may include the apparatus and systems of various aspects can broadly include a variety of electronic and computer systems. Techniques may be implemented using two or more specific interconnected hardware modules or devices with related control and data signals that can be communicated between and through the modules, or as portions of an ASIC. Additionally, the techniques described herein may be implemented by software programs executable by a computer system. As an example, implementations can include distributed processing, component/object distributed processing, and parallel processing. Moreover, virtual computer system processing can be constructed to implement one or more of the techniques or functionalities, as described herein.

Examples, as described herein, may include, or may operate on, processors, logic, or a number of components, modules, or mechanisms (herein "modules"). Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. The software, when executed by the underlying hardware of the module, causes the hardware to perform the specified operations.

Accordingly, the term "module" is understood to encompass at least one of a tangible hardware or software entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor to constitute a particular module at one instance of time and to constitute a different module at a different instance of time.

While the machine-readable medium may be a single medium, the term "machine-readable medium" may include a single medium or multiple media (e.g., at least one of a centralized or distributed database, or associated caches and servers) configured to store the one or more instructions. The term "machine-readable medium" may include any medium that is capable of storing, encoding, or carrying instructions for execution by a processor such as CPU 210 and that cause the CPU 210 to perform any one or more of the techniques of the present disclosure, or that is capable of storing, encoding, or carrying data structures used by or associated with such instructions. Non-limiting machine-readable medium examples may include solid-state memories, and optical and magnetic media. Specific examples of machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and Digital Video Disks (DVD)-ROM disks. In some examples, machine-readable media may include non-transitory machine-readable media. In some examples, machine-readable media may include machine-readable media that is not a transitory propagating signal.

Example communication networks that may be implemented by the mobile device may include a local area network (LAN), a wide area network (WAN), a packet data network (e.g., the Internet), mobile telephone networks (e.g., cellular networks), Plain Old Telephone Service (POTS) networks, and wireless data networks (e.g., Institute of Electrical and Electronics Engineers (IEEE) 802.11 family of standards known as WI-FI®), IEEE 802.15.4 family of standards, a Long Term Evolution (LTE) family of standards, a Universal Mobile Telecommunications System (UMTS) family of standards, peer-to-peer (P2P) networks, among others. In an example, the short range transceivers 255 and the WWAN transceivers 250 may include a plurality of antennas to wirelessly communicate using at least one of single-input multiple-output (SIMO), multiple-input multiple-output (MIMO), or multiple-input single-output (MISO) techniques. In some examples, a network interface device may wirelessly communicate using Multiple User MIMO techniques.

The features and flow charts described herein can be embodied in one or more methods as method steps or in one more applications as described previously. According to some configurations, an "application" or "applications" are program(s) that execute functions defined in the programs. Various programming languages can be employed to generate one or more of the applications, structured in a variety of manners, such as object-oriented programming languages (e.g., Objective-C, Java, or C++) or procedural programming languages (e.g., C or assembly language). In a specific example, a third-party application (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or other mobile operating systems. In this example, the third-party application can invoke API (Application Programming Interface) calls provided by the operating system to facilitate functionality described herein. The applications can be stored in any type of computer readable medium or computer storage device and be executed by one or more general purpose computers. In addition, the methods and processes disclosed herein can alternatively be embodied in specialized computer hardware or an application specific integrated circuit (ASIC), field programmable gate array (FPGA) or a complex programmable logic device (CPLD).

Program aspects of the technology may be thought of as "products" or "articles of manufacture" typically in the form of at least one of executable code or associated data that is carried on or embodied in a type of machine-readable medium. For example, programming code could include code for the touch sensor or other functions described herein. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications may enable loading of the software from one computer or processor into another. Thus, another type of media that may bear the programming, media content or meta-data files includes optical, electrical, and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to "non-transitory," "tangible," or "storage" media, terms such as computer or machine "readable medium" refer to any medium that participates in providing instructions or data to a processor for execution.

Hence, a machine-readable medium may take many forms of tangible storage medium. Non-volatile storage media include, for example, optical or magnetic disks, such as any of the storage devices in any computer(s) or the like, such as may be used to implement the client device, media gateway, transcoder, etc. shown in the drawings. Volatile storage media include dynamic memory, such as main memory of such a computer platform. Tangible transmission media include coaxial cables, copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read at least one of programming code or data. Many of these forms of computer readable media may be involved in carrying one or more sequences of one or more instructions to a processor for execution.

The scope of protection is limited solely by the claims that now follow. That scope is intended and should be interpreted to be as broad as is consistent with the ordinary meaning of the language that is used in the claims when interpreted considering this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

In addition, in the foregoing Detailed Description, various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are the best mode and other examples, it is understood that various modifications may be made therein and that the subject matter disclosed herein may be implemented in various forms and examples, and that they may be applied in numerous applications, only some of which have been described herein. It is intended by the following claims to claim all modifications and variations that fall within the true scope of the present concepts.

What is claimed is:

1. A mobile device, comprising:
    a camera;
    a memory that stores instructions; and
    a processor coupled to the memory, wherein the processor executes the instructions to assign a character to at least one participant in a multi-party augmented reality (AR) session by executing instructions to perform operations including:
    receiving an indication that the character is to be assigned to one or more participants in the multi-party AR session, the multi-party AR session including at least two co-located session participants, the multi-party AR session enabling all session participants to communicate with one another using respective mobile devices;
    receiving a character assignment trigger event for assignment of the character from at least one of the participants in the multi-party AR session, the character assignment trigger event comprising a gesture detected from the at least one of the participants by another co-located session participant in the multi-party AR session;
    obtaining a user identification (ID) of the at least one of the participants in the multi-party AR session who provided the character assignment trigger event;
    assigning the character to the at least one of the participants in the multi-party AR session who provided the character assignment trigger event;
    broadcasting to the at least two co-located session participants the character assignment of the character to the at least one of the participants in the multi-party AR session who provided the character assignment trigger event; and
    mapping, to the assigned character, the user ID of the at least one of the participants in the multi-party AR session who provided the character assignment trigger event.

2. The mobile device of claim 1, further comprising the processor executing instructions to send, after receiving the indication that the character is to be assigned to the one or more participants in the multi-party AR session, a message to a participant in the multi-party AR session to which the character has not been previously assigned, the message indicating that the character or another character may be assigned to the participant to which the character has not been previously assigned when the participant to which the character has not been previously assigned provides a predetermined gesture.

3. The mobile device of claim 2, wherein receiving the character assignment trigger event for assignment of the character comprises the processor executing instructions to detect a waving gesture from the at least one of the participants by the another co-located session participant in the multi-party AR session.

4. The mobile device of claim 3, wherein obtaining the user ID of the at least one of the participants who provided the character assignment trigger event comprises the processor executing instructions to capture a screen-space position of a head of the at least one of the participants who provided the character assignment trigger event, compare the captured screen-space position of the head of the at least one of the participants who provided the character assignment trigger event to a screen-space position of each co-located session participant, and determine a user ID of the co-located session participant who is closest to the screen-space position of the head of the at least one of the participants who provided the character assignment trigger event.

5. The mobile device of claim 1, wherein the processor further executes instructions to assign a virtual costume to the at least one of the participants in the multi-party AR session who provided the character assignment trigger event by:
obtaining a screen-space position of a mobile device of the at least one of the participants in the multi-party AR session who provided the character assignment trigger event;
determining whether a body that has not been assigned a virtual costume is detected in a view of the camera; and
for each body in the view of the camera that has not been assigned a virtual costume, obtaining a screen-space position of a head of the body, determining whether the screen-space position of the head of the body is closest to the screen-space position of a mobile device of the at least one of the participants in the multi-party AR session who provided the character assignment trigger event, and assigning the body having the closest screen-space position to the mobile device of the at least one of the participants in the multi-party AR session who provided the character assignment trigger event as the body of the at least one of the participants in the multi-party AR session who provided the character assignment trigger event.

6. The mobile device of claim 5, further comprising the processor executing instructions to track the body of the at least one of the participants in the multi-party AR session who provided the character assignment trigger event, retrieve a body mesh corresponding to the virtual costume of the character, and setting the body mesh to the tracked body of the at least one of the participants in the multi-party AR session who provided the character assignment trigger event.

7. The mobile device of claim 6, further comprising the processor executing instructions to broadcast to the at least two co-located session participants the character assignment of the virtual costume to the at least one of the participants in the multi-party session who provided the character assignment trigger event.

8. The mobile device of claim 5, wherein the processor executing instructions to determine whether the screen-space position of the head of the body is closest to the screen-space position of a mobile device of the at least one of the participants in the multi-party AR session who provided the character assignment trigger event comprises the processor executing instructions to:
(a) obtain session data relating to a first participant from a list of co-located participants in the multi-party AR session;
(b) determine a screen-space position of the first participant;
(c) compare the screen-space position of the head of the at least one of the participants in the multi-party AR session who provided the character assignment trigger event to the screen-space position of the first participant; and
(d) repeat steps (a)-(c) for each co-located participant in the multi-party AR session.

9. The mobile device of claim 8, wherein the processor executing instructions to determine whether the screen-space position of the head of the body is closest to the screen-space position of a mobile device of the at least one of the participants in the multi-party AR session who provided the character assignment trigger event comprises the processor executing instructions to determine the user ID of the closest co-located participant.

10. A method of assigning a character to at least one participant in a multi-party augmented reality (AR) session, comprising:
receiving an indication that the character is to be assigned to one or more participants in the multi-party AR session, the multi-party AR session including at least two co-located session participants, the multi-party AR session enabling all session participants to communicate with one another using respective mobile devices;
receiving a character assignment trigger event for assignment of the character from at least one of the participants in the multi-party AR session, the character assignment trigger event comprising a gesture detected from the at least one of the participants by another co-located session participant in the multi-party AR session;
obtaining a user identification (ID) of the at least one of the participants in the multi-party AR session who provided the character assignment trigger event;
assigning the character to the at least one of the participants in the multi-party AR session who provided the character assignment trigger event;
broadcasting to the at least two co-located session participants the character assignment of the character to the at least one of the participants in the multi-party AR session who provided the character assignment trigger event; and
mapping the user ID to the assigned character.

11. The method of claim 10, further comprising sending, after receiving the indication that the character is to be assigned to the one or more participants in the multi-party AR session, a message to at least one a participant in the multi-party AR session to which the character has not been previously assigned, the message indicating that the character or another character may be assigned to the participant to which the character has not been previously assigned when the participant to which the character has not been previously assigned provides a predetermined gesture.

12. The method of claim 11, wherein receiving the character assignment trigger event for assignment of the character comprises detecting a waving gesture from the at least one of the participants by the another co-located session participant in the multi-party AR session.

13. The method of claim 12, wherein obtaining the user ID of the at least one of the participants who provided the character assignment trigger event comprises capturing a screen-space position of a head of the at least one of the participants who provided the character assignment trigger event, comparing the captured screen-space position of the head of the ee located-session at least one of the participants who provided the character assignment trigger event to a screen-space position of each co-located session participant, and determining a user ID of the co-located session participant who is closest to the screen-space position of the head of the at least one of the participants who provided the character assignment trigger event.

14. The method of claim 10, further comprising assigning a virtual costume to the at least one of the participants in the multi-party AR session who provided the character assignment trigger event by:
obtaining a screen-space position of a mobile device of the at least one of the participants in the multi-party AR session who provided the character assignment trigger event;
determining whether a body that has not been assigned a virtual costume is detected in a view of a camera of a mobile device; and
for each body in the view of the camera of the mobile device that has not been assigned a virtual costume, obtaining a screen-space position of a head of the body, determining whether the screen-space position of the head of the body is closest to the screen-space position of a mobile device of the at least one of the participants in the multi-party AR session who provided the character assignment trigger event, and assigning the body having the closest screen-space position to the mobile device of the at least one of the participants in the multi-party AR session who provided the character assignment trigger event as the body of the at least one of the participants in the multi-party AR session who provided the character assignment trigger event.

15. The method of claim 14, further comprising tracking the body of the at least one of the participants in the multi-party AR session who provided the character assignment trigger event, retrieving a body mesh corresponding to the virtual costume of the character, and setting the body mesh to the tracked body of the at least one of the participants in the multi-party AR session who provided the character assignment trigger event.

16. The method of claim 15, further comprising broadcasting to the at least two co-located session participants the character assignment of the virtual costume to the at least one of the participants in the multi-party session who provided the character assignment trigger event.

17. The method of claim 14, further comprising determining whether the screen-space position of the head of the body is closest to the screen-space position of a mobile device of the at least one of the participants in the multi-party AR session who provided the character assignment trigger event by:
(a) obtaining session data relating to a first participant from a list of co-located participants in the multi-party AR session;
(b) determining a screen-space position of the first participant;
(c) comparing the screen-space position of the head of the at least one of the participants in the multi-party AR session who provided the character assignment trigger event to the screen-space position of the first participant; and
(d) repeating steps (a)-(c) for each co-located participant in the multi-party AR session.

18. The method of claim 17, wherein determining whether the screen-space position of the head of the body is closest to the screen-space position of a mobile device of the at least one of the participants in the multi-party AR session who provided the character assignment trigger event further comprises determining the user ID of the closest co-located participant.

19. A non-transitory computer-readable storage medium that stores instructions that when executed by at least one processor cause the at least one processor to assigning a character to at least one participant in a multi-party augmented reality (AR) session by performing operations including:
receiving an indication that the character is to be assigned to one or more participants in the multi-party AR session, the multi-party AR session including at least two co-located session participants, the multi-party AR session enabling all session participants to communicate with one another using respective mobile devices;
receiving a character assignment trigger event for assignment of the character from at least one of the participants in the multi-party AR session, the character assignment trigger event comprising a gesture detected from the at least one of the participants by another co-located session participant in the multi-party AR session;
obtaining a user identification (ID) of the at least one of the participants in the multi-party AR session who provided the character assignment trigger event;
assigning the character to the at least one of the participants in the multi-party AR session who provided the character assignment trigger event;
broadcasting to the at least two co-located session participants the character assignment of the character to the at least one of the participants in the multi-party AR session who provided the character assignment trigger event; and
mapping the user ID to the assigned character.

20. The non-transitory computer-readable storage medium of claim 19, further comprising instructions that when executed by the at least one processor cause the at least one processor to assign a virtual costume to the at least one of the participants in the multi-party AR session who provided the character assignment trigger event by:
obtaining a screen-space position of a mobile device of the at least one of the participants in the multi-party AR session who provided the character assignment trigger event;
determining whether a body that has not been assigned a virtual costume is detected in a view of a camera of a mobile device; and
for each body in the view of the camera of the mobile device that has not been assigned a virtual costume, obtaining a screen-space position of a head of the body, determining whether the screen-space position of the head of the body is closest to the screen-space position of a mobile device of the at least one of the participants in the multi-party AR session who provided the character assignment trigger event, and assigning the body having the closest screen-space position to the mobile device of the at least one of the participants in the multi-party AR session who provided the character assignment trigger event as the body of the at least one of the participants in the multi-party AR session who provided the character assignment trigger event.

\* \* \* \* \*